(12) United States Patent
Tamamura

(10) Patent No.: US 7,122,779 B2
(45) Date of Patent: Oct. 17, 2006

(54) LASER LINE BEAM EMITTING APPARATUS, AND DUST PROTECTIVE COVERING PROVIDED TO THE SAME

(75) Inventor: Akihito Tamamura, Sabae (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 213 days.

(21) Appl. No.: 10/616,011

(22) Filed: Jul. 9, 2003

(65) Prior Publication Data

US 2004/0025359 A1 Feb. 12, 2004

(30) Foreign Application Priority Data

Jul. 29, 2002 (JP) .............................. 2002-219134

(51) Int. Cl.
*H01J 3/14* (2006.01)
*G01C 15/00* (2006.01)

(52) U.S. Cl. ............................. 250/216; 33/286; 33/290

(58) Field of Classification Search ................ 250/221, 250/216, 239; 33/291, 286, 283, 295, 290; 372/12, 14; 362/16
See application file for complete search history.

(56) References Cited

U.S. PATENT DOCUMENTS 6,035,540 A * 3/2000 Wu et al. .................... 356/138
6,256,895 B1 7/2001 Akers ........................... 33/290

FOREIGN PATENT DOCUMENTS

JP 2000-18946 1/2000

* cited by examiner

*Primary Examiner*—Kevin Pyo
(74) *Attorney, Agent, or Firm*—Welsh & Katz, Ltd.

(57) ABSTRACT

The present invention relates to a laser line beam emitting apparatus having a laser beam emitter from which laser beam flux are emitted and an optical broad element for broadening the laser beam flux to predetermined directions in which objects to be emitted reside for drawing of a straight reference line thereon. The apparatus's housing has an improved dust protective covering fitted into an outlet thereof such that the reflected, broadened laser beam flux from the covering through the cylindrical rod lens of the laser beam emitter becomes no ghost. Preferably, such covering has a curvature formed on its inner surface such that the reflected, broadened laser beam flux therefrom through the laser beam emitter return to the inside of the apparatus.

14 Claims, 3 Drawing Sheets

LASER LINE BEAM EMITTING APPARATUS, AND DUST PROTECTIVE COVERING PROVIDED TO THE SAME

FIELD OF THE INVENTION

The present invention relates to a laser line beam emitting apparatus which provides production of emissive laser line beam with vertical or horizontal expansion, and particularly to a dust protective covering provided in an outlet for beam of the laser line beam emitting apparatus for protection of the interior from dust.

BACKGROUND OF THE INVENTION

The vertical or horizontal emissive laser line beam by such laser line beam emitting apparatus may be used as a vertical or horizontal reference line passing objects such as a ceiling, a floor and walls or front, side and back walls in constructs.

This laser beam, which is generally an elliptical beam with a transverse section as its feature, is passed into a horizontal or vertical axial cylindrical rod lens through a collimator lens and becomes a vertically or horizontally broadened beam.

The foregoing laser line beam emitting apparatus has, as production of the vertical or horizontal emissive laser line beam, use of a laser emitter, which is a component making up a laser unit held to a laser unit holder held from a gimbals mechanism, therein. The laser unit holder may be maintained in a desired position without tilt with respect to the position so that emission of adequate vertical or horizontal laser beam flux may be performed.

The interior of the laser line beam emitting apparatus is provided with a laser beam source comprised of a semiconductor laser for emission of laser line beam and optical or precisely processing instruments such as cylindrical rod lens and gimbals mechanism, that are assembled therein. Therefor, the laser line beam emitting apparatus has a main covering so that it is airtight for protection of the interior from enterer of dust. Such laser line beam emitting apparatus has outlet(s) formed at predetermined position(s) of the main covering. The outlet(s) permit transmission of respective laser beam flux and are provided with respective dust protective coverings for protection from invading dust. The dust protective covering comprises a transparent glass or synthetic resin plate or film and so on.

The following gives a summarized description of a conventional laser line beam emitting apparatus, with reference to FIGS. 3 to 5. In FIG. 3, an underside base board 10 has three legs 12 mounted thereto such that the base board may be maintained in an approximate horizontal position through the legs. The upside base board 10 has a suitable number of columns 14 vertically stood thereon, each of the columns 14 has a gimbals mechanism 15 mounted at its top end, and a laser unit holder 24 is hung down from the gimbals mechanism. The laser unit holder 24 may have free swings to all directions.

The laser unit holder 24 has a first laser unit 30 tilted upward and mounted at its top end for emission of a vertical beam, a second laser unit 40 mounted in horizontal arrangement at a position below the gimbals mechanism 15 for emission of a horizontal beam, and a third laser unit 50 mounted at its lowermost with orientation to the undernearth for emission of spot(s) on a floor.

The first laser unit 30 for emission of a vertical beam comprises a laser beam source 31, a collimator lens 32 for collimated formation of the emissive laser beam from the laser beam source 31, and a cylindrical rod lens 33 for expansion of the collimated emissive beam only in vertical directions. The second laser unit 40 for emission of a horizontal beam also is of the approximate same construction, which comprises a laser beam source 41, a collimator lens 42 for parallel formation of the emissive laser beam from the laser beam source 31, and a cylindrical rod lens 43 for expansion of the paralleled emissive beam only in a horizontal direction. The third laser unit 50 for emission of spot(s) on a floor comprises a laser beam source 51, and a collimator lens 52 for collimated formation of the emissive laser beam from the laser beam source. Each of the laser units 30, 40, 50 is assembled into a cylindrical mirror. Each of the laser beam source 31, 41, 51 comprises, for example, a semiconductor laser.

The laser unit holder 24 is hung down through the gimbals mechanism 15 so that it may have an approximate vertical position. At the position electric power is applied to the laser beam sources 31, 41, 51 of respective first, second and third laser units 30, 40, 50, and then such laser beam flux are emitted out from respective laser units 30, 40, 50. The first laser unit 30 performs emission of a vertically broadened laser beam flux, which is drawn on its object(s) such as construct's wall(s) with drawing of a straight line on a floor and a ceiling that are continued to the corresponding walls, through respective transverse section, at the beam path. The second laser unit 40 performs emission of a horizontally broadened laser beam, which is drawn on its object(s) such as construct's walls at the beam path. The third laser unit 50 performs emission of collimated laser beam flux to the undernearth with drawing of laser spots on its objects such as a construct's floor on which the laser beams are formed at reference markings as indicated thereon.

Such laser line beam emitting apparatus has a main covering 60 provided for covering over the foregoing components. A vertical longitudinal outlet 61 is formed in the main covering 60 so as to avoid interruption of the vertically broadened, emitted laser beam flux from the laser unit 30, while a horizontal longitudinal outlet 62 is formed in the main covering 60 so as to avoid interruption of the horizontally broadened, emitted laser beam flux from the laser unit 40. The foregoing dust protective covering is provided into each of the outlets 61, 62.

FIG. 4 shows an example of provision of a dust protective covering according to the conventional laser line beam emitting apparatus. In FIG. 4, a dust protective covering 63, which is formed of a flat transparent plate, is fitted in the outlet formed at the ceiling of the main covering 60 of the laser line beam emitting apparatus. In addition, a dust protective covering 64, which is formed of a flat transparent plate, is fitted in the outlet formed at the front of the main covering 60 nearer to the ceiling thereof. Any of the dust protective coverings 63, 64 permit passage of the vertically broadened laser beam from the laser unit 30.

From the foregoing, each of the dust protective coverings 63, 64 of the laser line beam emitting apparatus comprises a flat transparent material formed of glass, synthetic resin or film and so on. Since each of them has an inner surface parallel with the transverse section of the emitted laser beam, the reflected beam therefrom returns to the interior of the apparatus, and thus does not cause the emitted objects to be subject to, for example, produced ghost. However, when the laser beam flux with formation of a vertical or horizontal straight reference line on the objects are transmitted onto the dust protective coverings 63, 64, most of the section of the laser beam flux are not parallel to the inner surfaces of respective dust protective coverings 63, 64, because of that the laser beam flux is broadened through the cylindrical rod lens. Hence, most of the section of the broadened laser beam flux through the cylindrical rod lens will be directed diagonally with respect to the inner surfaces of respective dust protective coverings 63, 64.

For the reason, as shown by the numeral reference 65 in FIG. 5, for example, a part of the diagonally directed laser beam with respect to the inner surface of the dust protective covering 63 are reflected from the inner surface of the dust protective covering 63, and then go toward another dust protective covering 64 for passage through the dust protective covering 64 and the emission onto the objects. This produces a ghost formed by the laser beam as represented by the numeral reference 65, whereby both of the original correct reference and forgeable lines are emitted, which are misleading.

SUMMARY OF THE INVENTION

The present invention is made in order to avoid the foregoing problems of the prior arts, and provides, as its objects, an improved dust protective covering of a laser line beam emitting apparatus for avoidance of resultant ghost.

In view of the subject matters as previously described, it is object of the present invention to provide a laser line beam emitting apparatus having improvement in production of its reference line formed on the emitted objects, and a dust protective covering provided in the same for the improvement.

The laser line beam emitting apparatus provides production of a vertical or horizontal straight line formed and drawn as the reference line on the emitted objects such as ceiling, walls and floor or walls in a construct. Such laser line beam emitting apparatus has a laser unit in which a cylindrical lens is provided approximately parallel to or perpendicular to the horizontal. The emitted laser line beam flux are broadened to two opposite directions approximately horizontally separating from the central optical axis through the cylindrical lens so that a vertical or horizontal straight line is formed and drawn.

The laser line beam emitting apparatus has a main covering having at least an outlet formed thereon at a predetermined position. The broadened, emitted laser beam flux from the laser unit go into the outlet without the interruption. The outlet of the main covering also has, preferably, two or three connectable dust protective coverings fitted therein. For use in the laser unit for formation of a vertical reference line, such two dust protective coverings are provided in corresponding outlets as formed at the ceiling to the front side nearer to the ceiling, while such three dust protective coverings are provided in corresponding outlets as formed at the ceiling, the front side nearer to the ceiling, and the rear side nearer to the ceiling of the main covering.

Whereas, for use in the laser unit for formation of a horizontal reference line, such three dust protective coverings are provided in corresponding outlets as formed at the front side, one lateral side nearer to the front side, and the other side nearer to the front side of the main covering. It also may be provided in corresponding outlets as formed at the rear side, one side nearer to the rear side, and the other side nearer to the front side of the main covering.

The shape of the inner surface of the dust protective covering is formed such that the reflected laser beam flux with cause of formation of ghost on the objects go back to the interior of the apparatus. Such inner surface of the dust protective covering has a recessed curve. The recessed curve returns the reflected laser beam flux having formation of ghost on the objects, to the inside apparatus. Because of no return of the laser beam flux to the other dust protective coverings by the reflection from the inner surface of the dust protective covering, ghost is not produced.

With regard to the inner surface, one or both of the two dust protective coverings may have respective recessed curves formed thereon, and some or all of the three dust protective coverings may have respective curves formed thereon. In addition, the shapes of any curve of the two or three dust protective coverings may be made in accordance with the outer surface of the corresponding cylindrical rod lenses. However, this shape requires avoidance of produced ghost from reflection of the laser beam flux in part from the inner surfaces of the coverings.

The plurality of dust protective coverings may comprise light-transmissible plates that are held by partial main covering elements formed between respective connections, respectively. The dust protective coverings also may be formed of a film, a single piece such that respective coverings appear and are provided at the corresponding surfaces of the main covering of the laser line beam emitting apparatus.

The two dust protective coverings comprise a pair of flat transparent plates as arranged forward of the beam emitter. One of the flat transparent plates is arranged in passage of the central optical axis of the laser emitter and curved and recessed forward, while the other is of a flat shape.

The three dust protective coverings comprise first to three plates about the beam emitter. The first plate has a center through which the central optical axis passes. For example, it has front and back (the vertical reference line) or right and left (the horizontal reference line) sides. The second plate is extended downward or backward from one of the leading and trailing edges or the right and left sides with respect to the apparatus, while the third plate is extended downward or backward from the other with respect to the apparatus.

The curve may be formed on all or some of the internal surfaces of respective two or three dust protective coverings.

Except for a shape of the dust protective covering, the laser line beam emitting apparatus may be of any constructions, but requires having functions of expansion and reflection of the laser beam flux to any two opposite directions with respect to the central optical axis and from the inner surface of the dust protective covering.

For example, a device for producing the broadened laser beam flux is not limited to a rod lens. A conical mirror, which is disposed ahead of the laser unit, may reflect the emissive laser beam flux so that the broadened laser beam flux are produced. In this case, concerning a vertical or horizontal reference line from the broadened laser beam flux, the emissive laser beam flux from the laser unit may be broadened around 360 degrees of horizon. In such laser line beam emitting apparatus with production of the broadened laser beam flux by its conical mirror, the outlets may be formed on both of the ceiling and bottom or front and rear faces. Therefore, the dust protective coverings may be provided at both of the top and bottom or front and rear faces.

EMBODIMENTS OF THE PRESENT INVENTION

Figure 1:
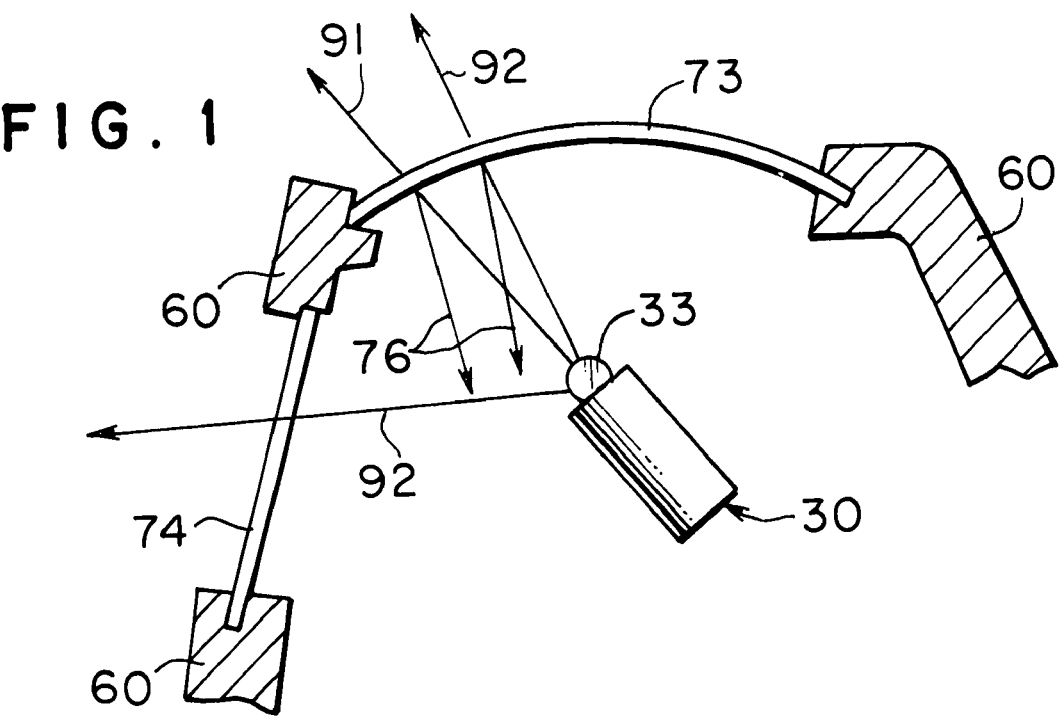
FIG. 1 is a view in transverse section within the purview in which embodiment of the dust protective covering of the laser line beam emitting apparatus according to the present invention is shown.
Figure 2:
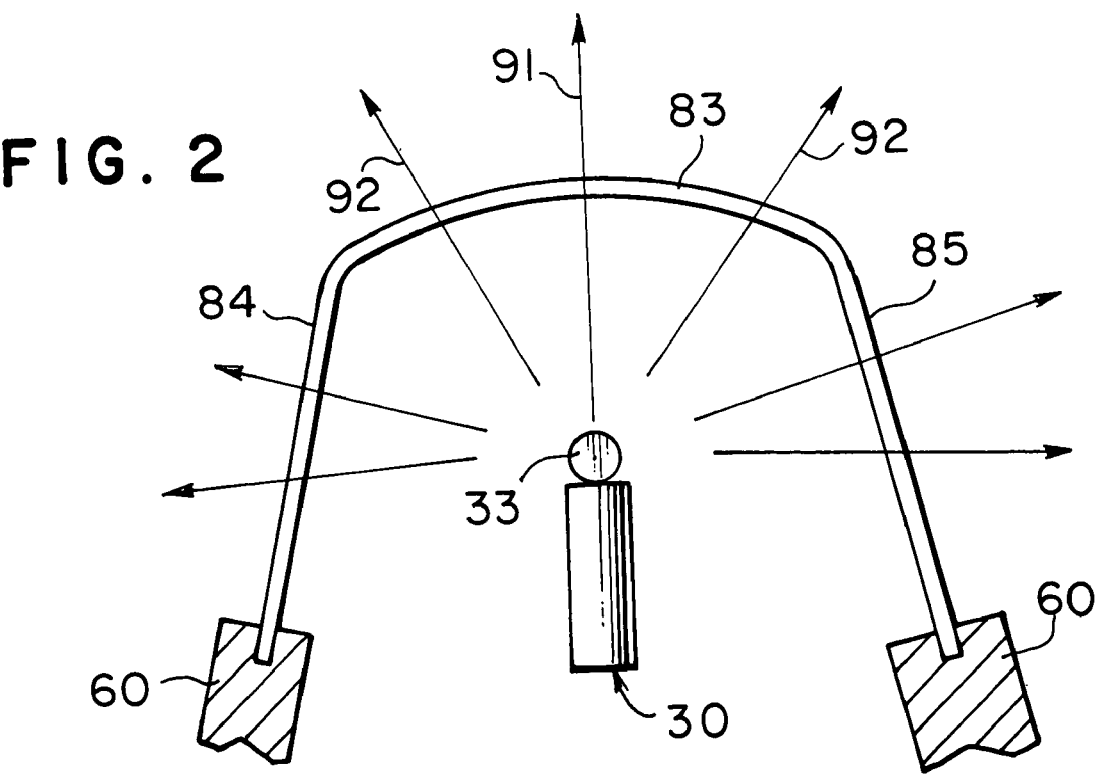
FIG. 2 is a view in transverse section within the purview in which another embodiment of the dust protective covering of the laser line beam emitting apparatus according to the present invention is shown.
Figure 3:
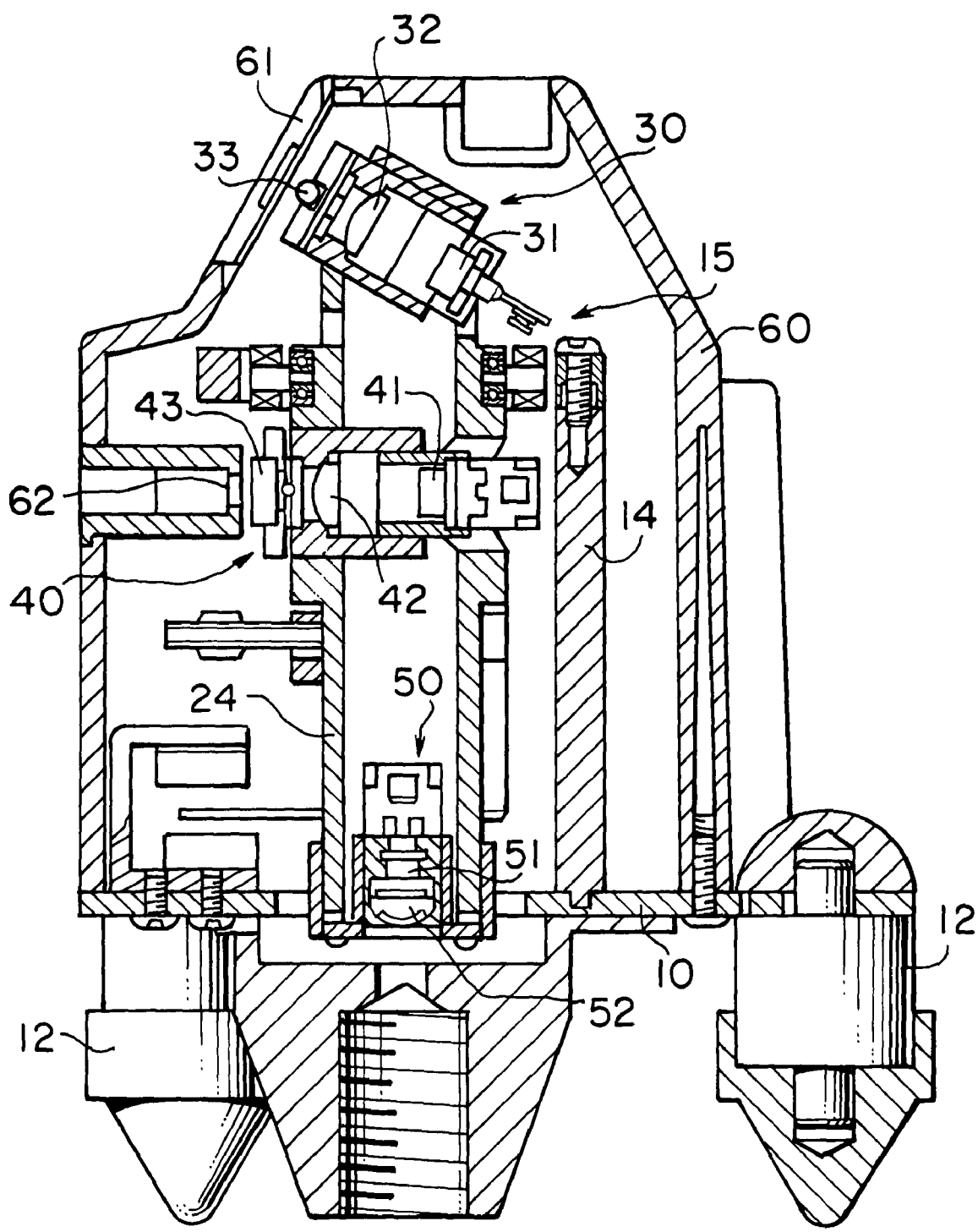
FIG. 3 is a vertical section view of showing an example of the laser line beam emitting apparatus appliable to the present invention.
Figure 4:
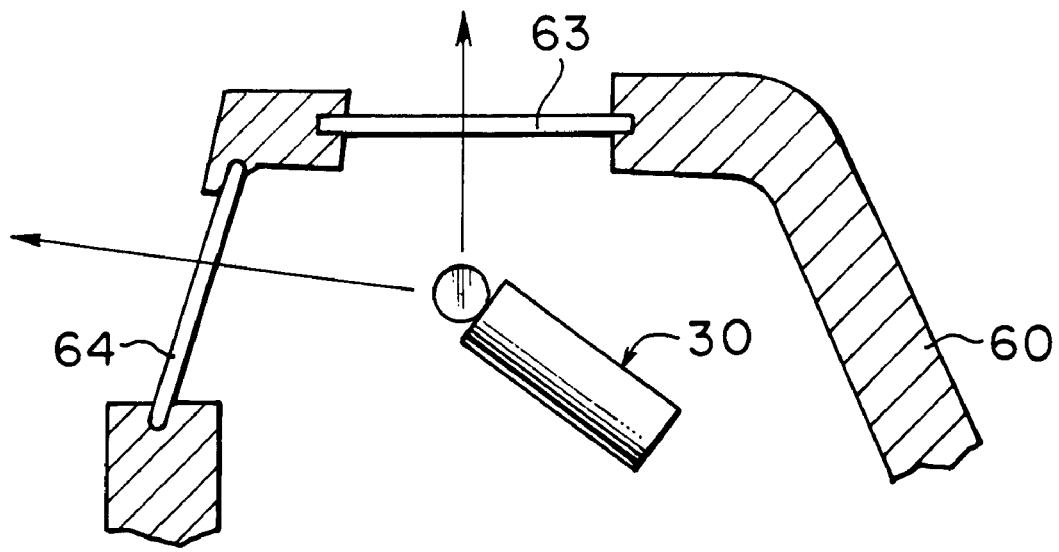
FIG. 4 is a view in transverse section within the purview in which an example of the dust protective covering's construction in a conventional laser line beam emitting apparatus is provided.
Figure 5:
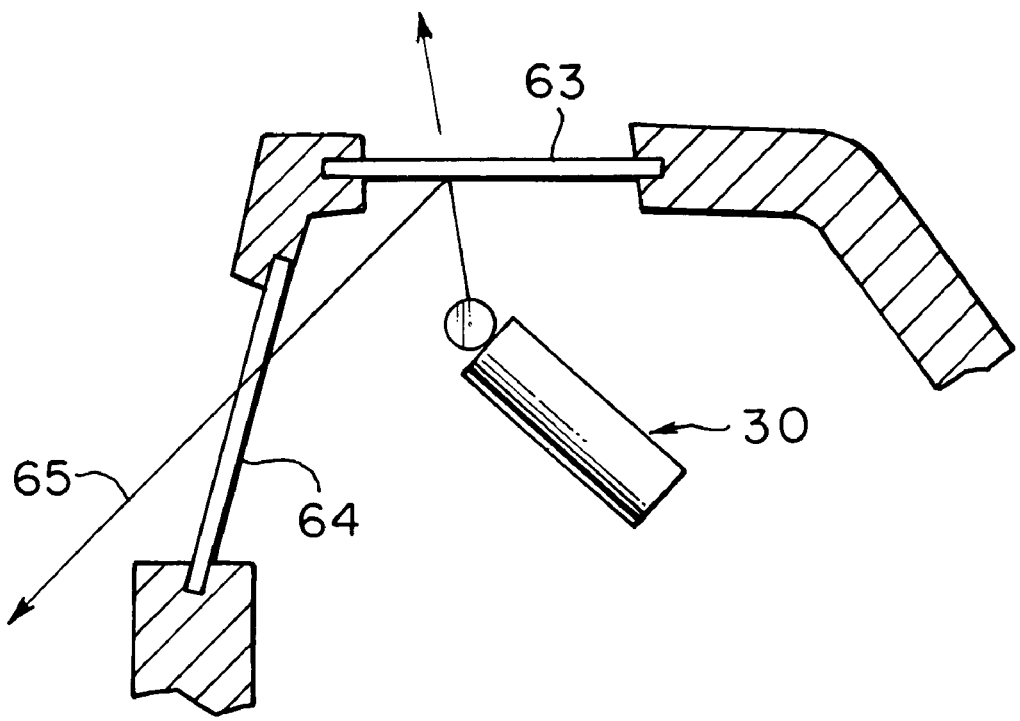
FIG. 5 is a view in transverse section within the purview in which the problem point of the dust protective covering in the foregoing conventional laser line beam emitting apparatus is provided.

The followings are descriptions of embodiments of dust protective coverings of a laser line beam emitting apparatus according to the present invention, with reference to FIGS. 1 to 3. In addition, the present invention provides features in a shape of the dust protective covering of the laser line beam emitting apparatus, and the associated laser line beam emitting apparatus may be of any construction except for the dust protective covering. Therefore, the descriptions are emphasized on a constructive part of the dust protective covering. Additionally, in FIGS. 1 and 2, common or same components with the conventional ones in FIGS. 4 and 5 are designated by the common or same numerals.

Referring to FIGS. 1, 3, the laser line beam emitting apparatus has an outlet formed between the ceiling and the front nearer to the ceiling of the main covering 60, and dust protective coverings 73 and 74 in combination therewith comprise light-transmissible plates and permit transmission of the vertically broadened laser beam flux 91, 92, whereby a vertical reference line is drawn on its objects to be emitted such as walls or ceiling.

Such embodiment on FIG. 2 may provide the same operational advantage as one of the embodiment on FIG. 1. In addition, connections of the dust protective covering 83 to the corresponding dust protective coverings 84, 85 do not require a boundary therebetween where a part of the main covering 60 resides, there is an advantage of connected reference line of the emitted laser beam on the object without discontinuity.

The dust protective covering 73 is formed such that at least its inner surface is curved with recess like a cylindrical-shape concave, while the dust protective covering 74 is formed in a flat surface. Referring to FIG. 3, the outlets for the dust protective coverings 73, 74 correspond to the position of numeral 61's one. Referring to FIG. 1, between the dust protective coverings 73 and 74 at respective corresponding proximal and distal ends held in the outlet 61, a part of the main covering 60 resides, whereby the dust protective coverings are held in corresponding outlets.

In this position, the dust protective covering 73 is arranged transversely of the central optical path 91 of the vertically broadened, emitted laser beam flux 92 from the laser unit 40, while the dust protective covering 74 is arranged transversely of only the broadened other beam flux 92.

The curved inner surface of the dust protective covering 73 allows return of the vertically broadened, emitted laser beam from the laser unit 30 with reflection therefrom into the interior of the laser line beam emitting apparatus. Thus, it can eliminate transmission of a part of the reflected, broadened laser beam flux 92 from the inner surface of the dust protective covering 73 through the laser unit 30, to the outside of the laser line beam emitting apparatus through the dust protective covering 74. Hence, emission of an original correct reference line on the objects to be emitted is only performed, but emission of the ghost-forged line is avoided, whereby the misleading may be prevented.

For the embodiment in FIG. 1, it will be found that curve of the dust protective covering 73 may be formed in accordance with the outer surface of the cylindrical rod lens 33 having an arc formed about the central axis thereof. However, the form of the dust protective covering 73 is not limited to such shape. In addition, according to the embodiment in FIG. 1, the other dust protective covering 74 has shape of a flat, but like the foregoing dust protective covering 73, also may have a recessed curve so that the reflected in part, broadened, emissive laser beam flux 92 therefrom through the laser emitter 30 go back to the inside of the laser line beam emitting apparatus.

Next, description of embodiment in FIG. 2 is given. The different point in the embodiment in FIG. 2 from one in FIG. 1 is that provisions of a dust protective covering 83 at the ceiling of the main covering 60 of the laser line beam emitting apparatus and dust protective coverings 84, 85 connected to the corresponding leading and trailing ends thereof and arranged at the corresponding front and rear faces of the main covering 60 are made.

Hold of such parts is made by insertion of the outer edges of respective dust protective coverings 84, 85 into for example, corresponding grooves formed on respective front and rear top ends of the main covering 60.

The dust protective covering 83 has a recessed curve with formation of a part-cylindrical concave on its inner surface such that the reflected, broadened emissive laser beam flux 92 therefrom through the laser unit 30 return to the interior of the laser line beam emitting apparatus. Whereas, each of the dust protective coverings 84, 85 has a flat shape. The recessed curve of the dust protective covering 83 may be made in accordance with the outer surface of the cylindrical rod lens 33 having an arc formed about the central axis thereof, but is not necessarily limited to the arc formed about the central axis thereof. In addition, the inner surfaces of the dust protective coverings 84, 85 each also may have a part-cylindrical concave curve in accordance with the outer surface of the cylindrical rod lens 33 such that the reflected, broadened emissive laser beam flux 92 therefrom through the laser unit 30 return to the interior of the laser line beam emitting apparatus. However, each of the recessed curves of the dust protective coverings 83 to 85 is not necessarily required of formation of a part-cylindrical concave made in accordance with the outer surface of the cylindrical rod lens 33.

Such embodiment on FIG. 2 may provide the same operational advantage as one of the embodiment on FIG. 1. In addition, connections of the dust protective covering 83 to the corresponding dust protective coverings 84, 85 do not require a boundary therebetween where a part of the main covering 60 resides, there is an advantage of connected reference line of the emitted laser beam on the object without discontinuity.

In this position, the dust protective covering 83 with recessed curvature has a center through which the central optical axis 91 of the emitted laser beam from the laser unit 30 passes, while the dust protective coverings 84, 85 are arranged transversely of only the vertically broadened other beam flux 92.

As to the above, although the embodiments of the vertically emitted reference line by the broadened laser beam flux were described, the present invention may be applied for an outlet for emitted laser beam for formation of the horizontal reference line. With the foregoing construction, the formation of the horizontal reference line requires the outlets formed on the front and two side faces connected thereto. In such laser line beam emitting apparatus, the combined dust protective coverings 83 to 85 are appliable.

According to FIG. 3, the outlet for the horizontal laser line beam flux is formed ahead of the laser unit 40 (a portion as represented by the numeral reference 62) and extended to both side faces therefrom.

For example, FIG. 2 may be substituted for the description of the embodiments of formation of the horizontal reference line. In this case, FIG. 2 is a cross-sectional view with a portion taken away of and the top of the laser line beam emitting apparatus.

In FIG. 2, the dust protective coverings 83 to 85 are fitted in the corresponding outlets formed between the front face and two side faces of the main covering. Thus, the dust protective coverings 83, 84 and 85, respectively, are arranged at the front, left side and right side faces of the main covering.

In this case, formation of the foregoing curve is made on the internal surface of the front face of the main covering of the laser line beam emitting apparatus. Therefore, the central optical axis 91 of the emissive laser beam from the laser unit 30 as the laser unit 40 passes through the approximate center of the front face of the main covering.

Thus, when the horizontally broadened laser beam flux are reflected from the curved inner surface of the dust protective covering 83, the reflected laser beam flux return to the interior of the laser line beam emitting apparatus.

Concerning formation of the horizontal reference line, the internal surfaces of the dust protective coverings 84 and 85 also may be curved with recess. In addition, all or some of the curvatures of the internal surfaces of respective dust protective coverings 83 to 85 may be made in accordance with the curvature of the external surface of the cylindrical rod lens 43 of the laser unit 40.

This may prevent ghost produced in the horizontal reference line, and thus provide the same operational advantage as one of which the two or three dust protective coverings are provided in the outlet through which the vertically broadened laser beam flux pass.

In addition, when the laser line beam emitting apparatus has functions as produced formation of a vertical or horizontal reference line around 360 degrees of vertical or horizon, the outlet of the main covering may be formed on the side of both of the front and rear faces so that the dust protective coverings are fitted between both of the front and rear faces and two side faces of the main housing.

Such formation of a vertical or horizontal reference line around 360 degrees of vertical or horizon is disclosed by for example, JP unexamined patent publication No.2000-18946 and U.S. Pat. No. 6,546,636B2. The former provides teaching of the performance by a conical concave lens, and the latter provides teaching of the performance by a combination of two rod lenses and a single rod lens with transparent and semitransparent faces.

Additionally, the plurality of dust protective coverings 73, 74 or 83 to 85 comprise light-transmissible plates that are held by partial main covering elements formed between respective connections, respectively. The dust protective coverings also may be formed of a bent light-transmissible film, a single piece such that respective dust protective coverings appear and are provided at the corresponding surfaces of the main covering of the laser line beam emitting apparatus.

Therefore, according to the present invention, for the laser line beam emitting apparatus in which the emitted laser beam flux from its laser unit are broadened to any directions with respect to the central optical axis and transmitted into its dust protective covering for formation of a reference line on any objective surfaces by the laser beam, because of that the foregoing dust protective covering has, as described above, a recessed curvature formed by its inner surface such that the reflected, broadened emissive laser beam flux in part from the same dust protective covering through the laser unit returns to the inside of the apparatus, it eliminates emission of the reflected beam from the dust protective covering out the same apparatus, whereby prevention of formation of forgeable laser beam line by ghost beam is performed so that confusion of the forgeable line with the original correct reference line may be avoided.

The invention claimed is:

1. A laser line beam emitting apparatus comprising:
   a laser beam emitter for emitting a laser beam there from, the laser beam emitter having an optical broad element through which the emitted laser beam flux are vertically or horizontally broadened so that a vertical or horizontal straight line is formed and drawn on its objects, the broadened laser beam flux having a central optical axis,
   a main covering for surrounding and covering said laser beam emitter therewith, the main covering comprising a plurality of faces and having at least one long length outlet formed on said faces which the vertically or horizontally broadened laser beam flux reach, and
   a plurality of dust protective coverings consecutively provided in said outlet of the main covering for preventing entry of dust thereinto while allowing the passage therethrough of the broadened laser beam flux, the broadened laser beam flux being in part reflected from the interior of said dust protective covering to form a reflective laser beam, one of the dust protective coverings being arranged in a position through which said central optical axis of the broadened laser beam flux passes, the dust protective covering at the passage of the central optical axis of the broadened laser beam flux having an interior curvature such that all of the reflected laser beam is reflected into the interior of the apparatus, and the reflected laser beam does not pass through said dust protective covering.

2. The laser line beam emitting apparatus of claim 1, wherein said dust protective covering has an inner surface on which said curve is formed with recess.

3. The laser line beam emitting apparatus of claim 1, wherein said dust protective covering with curvature comprises a ceiling of said main covering.

4. The laser line beam emitting apparatus of claim 1, wherein said dust protective covering with curvature is arranged at face served as a front of said main covering.

5. A laser line beam emitting apparatus comprising:
   a main covering provided thereto, the main covering having at least a ceiling, a front, a back and sides;
   a first outlet formed between said ceiling and the front nearer to said ceiling of the main covering,
   a second outlet formed between said front and said sides of the main covering;
   first and/or second laser beam emitting units provided in said main covering for emitting first and/or second laser beams there from, each of the first and second laser beam units having first and second emission elements in which respective cylindrical rod lenses are provided, the emitted laser beam having a central optical axis and beam flux, the beam flux of the emitted laser beams each being, after being collimated therein, broadened to two opposite directions approximately vertically or horizontally broadening from the central optical axes through one of the cylindrical rod lens, the first unit being disposed behind said first outlet so that the vertically broadened laser beam is transmitted through the first outlet for formation of a vertical reference line drawn on its objects, the second unit being disposed behind of said second outlet so that the horizontally broadened laser beam is transmitted through the second outlet for formation of a horizontal reference line drawn on its objects; first and/or second dust protective covering members provided in said first and second outlets of the main covering, respectively and each having a reflecting surface formed on the inner surface thereof, the broadened, emitted laser beam flux from respective first and second units being in part reflected from the reflecting surface of the first and second dust protective covering members and in part passing therethrough; and one or more curvatures formed on the reflecting surfaces of respective first and second dust protective covering members such that the parts of said reflected laser beam flux from the reflecting surfaces of respective first and second dust protective covering members return into the apparatus.

6. The laser line beam emitting apparatus of claim 5, wherein said first dust protective covering member comprises at least a pair of covering elements, the first covering element being arranged on the beam path on which the central optical axis and laser beam flux of the emissive laserbeam from said first laser beam emitting unit run, the curvature of said first dust protective covering being formed from said first covering element, the second covering element being flat.

7. The laser line beam emitting apparatus of claim 6, wherein said second covering element of the first dust protective covering member also has a curvature formed on its internal surface.

8. The laser line beam emitting apparatus of claim 6, wherein said main covering has hold frames formed at a portion in which said first covering element of the first dust protective covering member is opposed to said second covering element of the first dust protective covering member at respective ends thereof, for holding thereon said first and second covering elements of the first dust protective covering.

9. The laser line beam emitting apparatus of claim 7, wherein said first and second covering elements of the first dust protective covering member are connected with each other at a portion where they are opposed to, and formed integrally with each other.

10. The laser line beam emitting apparatus of claim 9, wherein each of said cylindrical rod lenses of respective first and second laser beam emitting units has an outer surface with a curvature, and the curvatures of said first and/or second dust protective coverings members are formed in accordance with the curvatures of an external surfaces of respective cylindrical rod lenses, respectively.

11. The laser line beam emitting apparatus of claim 5, wherein each of said first and/or second dust protective coverings comprises three covering elements, the first covering element having a center portion arranged at an optical path through which the central optical axis of the broadened, emitted laser beam from the first or second laser beam emitting unit passes, and both edges, the second covering element extending from one of said edges to the interior of the apparatus, the third covering element extending from the other of said edges to the interior of the apparatus, said curvatures of the first and/or second dust protective coverings being formed on said first covering elements, respectively.

12. The laser line beam emitting apparatus of claim 11, wherein each of said cylindrical rod lenses of the first and/or second laser beam emitting units has an external surface with a curvature, and at least one of the curvatures of said first, second, and a third dust protective coverings is formed in accordance with respective ones of said cylindrical rod lenses of corresponding first and second laser beam emitters.

13. A dust protective covering provided in a laser line beam emitting apparatus having a housing; at least a laser beam emitter provided in said housing for emission and broadening of the laser beam flux to any directions in which objects to be emitted reside for draw of a straight reference line thereon, the objects being above, ahead and/or behind of or ahead, opposite sides and/or behind of the apparatus, the reference line being formed by the transverse section of said broadened, emitted laser beam flux; and an outlet provided on said housing for permitting escape of the broadened, emitted laser beam there from, the dust protective covering being provided in said outlet so as to protect the apparatus from dust, said dust protective covering comprising an inner surface opposite to said laser beam emitter, an outer surface opposite to said objects, and a curvature formed on said inner surface thereof so that a reflected, broadened laser beam flux therefrom wholly returns to the inside of the apparatus and does not pass through said dust protective covering.

14. The laser line beam emitting apparatus of claim 13, wherein said laser beam emitter has a cylindrical rod lens provided therein, wherein said cylindrical rod lenses of the laser beam emitter has an outer surface with curvature, and wherein said curvatures of the first and/or second dust protective coverings are formed in accordance with ones of said cylindrical rod lens.

* * * * *